US00RE48128E

(19) United States
(12) Reissued Patent
Smith et al.

(10) Patent Number: US RE48,128 E
(45) Date of Reissued Patent: Jul. 28, 2020

(54) METHOD OF CAPTURING INFORMATION ABOUT A RACK AND EQUIPMENT INSTALLED THEREIN

(71) Applicants: CommScope Technologies LLC, Hickory, NC (US); CommScope Connectivity UK Limited, London (GB)

(72) Inventors: Peter Smith, Chester (GB); David John Chirgwin, Chester (GB); Owen Marshall, Denbighshire (GB); Ian Butler, Cheadle (GB); Simon Colley, Gwyneld (GB); Kamlesh G. Patel, Chanhassen, MN (US); Eric W. Sybesma, Edina, MN (US); Jason Bautista, Mayer, MN (US)

(73) Assignees: CommScope Technologies LLC, Hickory, NC (US); CommScope Connectivity UK Limited, London (GB)

(21) Appl. No.: 16/232,691

(22) Filed: Dec. 26, 2018

Related U.S. Patent Documents

Reissue of:
(64) Patent No.: 9,824,474
Issued: Nov. 21, 2017
Appl. No.: 13/939,779
Filed: Jul. 11, 2013

U.S. Applications:
(60) Provisional application No. 61/670,508, filed on Jul. 11, 2012.

(51) Int. Cl.
*G06F 3/048* (2013.01)
*G06T 11/00* (2006.01)
(Continued)

(52) U.S. Cl.
CPC ..... *G06T 11/60* (2013.01); *G06F 3/048* (2013.01); *G06T 11/00* (2013.01); *G09G 5/377* (2013.01);
(Continued)

(58) Field of Classification Search
CPC ..... G06T 11/00; G06T 11/60; G06T 2207/20212; G06F 3/048; G09G 5/377; G09G 2340/12
See application file for complete search history.

(56) References Cited

U.S. PATENT DOCUMENTS 6,054,990 A * 4/2000 Tran ..... G06F 3/0488 345/179
9,824,474 B2 11/2017 Smith et al.
(Continued)

FOREIGN PATENT DOCUMENTS

WO 2012054346 4/2012
WO 2012054346 A1 4/2012

OTHER PUBLICATIONS

International Bureau, "Notification Concerning Transmittal of International Preliminary Report on Patentability from PCT Application No. PCT/US2013/050059 dated Jan. 22, 2015", from Foreign Counterpart to U.S. Appl. No. 13/939,779, Jan. 22, 2015, pp. 1-9, Published: Switzerland.
(Continued)

*Primary Examiner* — Robert L Nasser
(74) *Attorney, Agent, or Firm* — Fogg & Powers LLC

(57) ABSTRACT

One embodiment is directed to a method comprising obtaining, using a portable device, identifier information about one or more identifiers associated with one or more of a rack and equipment installed in the rack and displaying on the portable device a picture of the rack captured and displaying on the portable device an overlay that includes markings that define a perimeter of the rack and a plurality of equipment positions within the rack. The method further comprises receiving, by the portable device, an alignment of the overlay on the picture of the rack and the equipment positions and receiving location information for the rack. The method further comprises storing the picture of the rack,
(Continued)

the alignment of the overlay on the picture of the rack, the identifier location, and the location information by a management application. Other embodiments are disclosed.

22 Claims, 6 Drawing Sheets

(51) Int. Cl.
*G06T 11/60* (2006.01)
*G09G 5/377* (2006.01)

(52) U.S. Cl.
CPC ..... *G06T 2207/20212* (2013.01); *G09G 2340/12* (2013.01)

(56) References Cited

U.S. PATENT DOCUMENTS 10,078,812 B2 * 9/2018 Khuti ..... G06Q 10/087
2005/0219384 A1 * 10/2005 Herberger ..... G06T 1/0007 348/239
2006/0164245 A1 * 7/2006 Kibalo ..... G06Q 10/087 340/572.1
2009/0215471 A1 * 8/2009 Sands ..... G01S 13/876 455/457
2009/0309570 A1 12/2009 Lehmann et al.
2009/0312864 A1 12/2009 Hanel
2010/0182400 A1 * 7/2010 Nelson ..... G06T 7/0018 348/42
2010/0235484 A1 9/2010 Bolan et al.
2011/0022942 A1 * 1/2011 Flemings ..... G06F 17/30899 715/230
2011/0115816 A1 * 5/2011 Brackney ..... G06Q 10/06 345/629
2011/0164163 A1 * 7/2011 Bilbrey ..... G06F 1/1694 348/333.01
2011/0218730 A1 * 9/2011 Rider ..... G01C 21/00 701/533
2011/0241833 A1 * 10/2011 Martin ..... G08C 21/00 340/10.1
2013/0031202 A1 * 1/2013 Mick ..... G06Q 10/06 709/217
2013/0051611 A1 * 2/2013 Hicks ..... G06Q 10/0875 382/103
2013/0223684 A1 * 8/2013 Townend ..... G06Q 10/08 382/103
2014/0258052 A1 * 9/2014 Khuti ..... G06F 17/30244 705/28

OTHER PUBLICATIONS

International Searching Authority, "Notification of Transmittal of the International Search Report and the Written Opinion of the International Searching Authority from PCT Application No. PCT/US2013/050059 dated Oct. 24, 2013", from Foreign Counterpart to U.S. Appl. No. 13/939,779, Oct. 24, 2013, pp. 1-12, Published: KR.
U.S. Patent and Trademark Office, "Advisory Action", U.S. Appl. No. 13/939,779, dated May 11, 2016, pp. 1-3, Published: US.
U.S. Patent and Trademark Office, "Final Office Action", U.S. Appl. No. 13/939,779, dated Feb. 29, 2016, pp. 1-28, Published: US.
U.S. Patent and Trademark Office, "Final Office Action", U.S. Appl. No. 13/939,779, dated Apr. 11, 2017, pp. 1-29, Published: US.
U.S. Patent and Trademark Office, "Notice of Allowance", U.S. Appl. No. 13/939,779, dated Jul. 13, 2017, pp. 1-9, Published: US.
U.S. Patent and Trademark Office, "Office Action", U.S. Appl. No. 13/939,779, dated Oct. 4, 2016, pp. 1-29, Published: US.
U.S. Patent and Trademark Office, "Office Action", U.S. Appl. No. 13/939,779, dated Sep. 3, 2015, pp. 1-28, Published: US.
Khuti et al. Provisional U.S. Appl. No. 61/542,434, of 2014/0258052, filed Oct. 3, 2011.*
Korean Intellectual Property Office, "International Search Report and Written Opinion", "from PCT Counterpart of U.S. Appl. No. 13/939,779", Oct. 24, 2013, pp. 1-12, Published in: KR.

* cited by examiner

200

METHOD OF CAPTURING INFORMATION ABOUT A RACK AND EQUIPMENT INSTALLED THEREIN

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application claims the benefit of U.S. Provisional Patent Application Ser. No. 61/670,508, filed on Jul. 11, 2012, which is hereby incorporated herein by reference.

BACKGROUND

Various types of physical layer management (PLM) technology can be used to track cross connections made at patch panels or other inter-connection devices. Generally, such PLM technology include functionality to obtain information about what is connected to each service port of a patch panel or other inter-connection device and to communicate that information back to a management application. The management application stores the information and makes it available for various purposes (such as tracing connections and carrying out electronic work orders that specify how one or more connections are to be moved, added, or otherwise changed).

One type of PLM technology makes use of an Electrically Erasable Programmable Read-Only Memory (EEPROM) or other storage device that is integrated with or attached to a connector on a cable. The storage device is used to store information about the connector or cable along with other information. The port (or other connector) into which the associated connector is inserted is configured to read the information stored in the EEPROM when the connector is inserted into the port.

Another type of PLM technology makes use of so-called "ninth wire" technology. Ninth wire technology makes use of special cables that include an extra conductor or signal path (also referred to here as the "ninth wire") that is used for determining which port each end of the cables is inserted into.

Yet another type of PLM technology makes use of radio frequency identification (RFID) tags and readers. With RFID technology, an RFID tag is attached to or integrated with a connector on a cable. The RFID tag is used to store information about the connector or cable along with other information. The RFID tag can be read after the associated connector is inserted into a corresponding jack or other port using an RFID reader.

While the management application is typically able to automatically discover and connect with the controllers used with these types of PLM technology, the management application is typically not able to determine where the associated patch panel or other inter-connection device is installed. For example, when a new rack (or other cabinet or enclosure) is added to a network, information about where that rack is located (including, for example, a building address and/or room number for the rack) and what equipment is located in each position of the rack must be manually provided to the management application.

Conventional mechanisms for manually providing such information to the management application can be inconvenient to use, error prone, and/or may not capture additional information that may be useful.

SUMMARY

One embodiment is directed to a method comprising obtaining, using a portable device, identifier information about one or more identifiers associated with one or more of a rack and equipment installed in the rack. The rack comprises a plurality of equipment positions into which one or more items of equipment can be inserted and wherein the portable device comprises a camera and a screen. The method further comprises displaying on the screen of the portable device a picture of the rack captured using the camera and displaying on the screen of the portable device an overlay that includes markings that define on the screen a perimeter of the rack and the plurality of equipment positions within the rack. The method further comprises receiving, by the portable device, an alignment of the overlay on the picture of the rack and the equipment positions and receiving location information for the rack. The method further comprises storing the picture of the rack, the alignment of the overlay on the picture of the rack, the identifier location, and the location information by a management application. The picture of the rack, the alignment of the overlay on the picture of the rack, the identifier information, and the location information are associated with one another.

Another embodiment is directed to a portable device comprising a programmable processor configured to execute software, a screen coupled to the programmable processor, and a camera. The portable device is configured to obtain identifier information about one or more identifiers associated with one or more of a rack and equipment installed in the rack. The rack comprises a plurality of equipment positions into which one or more items of equipment can be inserted. The portable device is configured to display on the screen a picture of the rack captured using the camera and to display on the screen an overlay that includes markings that define on the screen a perimeter of the rack and the plurality of equipment positions within the rack. The portable device is configured to receive an alignment of the overlay on the picture of the rack and the equipment positions, receive location information for the rack, and communicate the picture of the rack, the alignment of the overlay on the picture of the rack, the identifier information, and the location information to a management application for storage thereby. The picture of the rack, the alignment of the overlay on the picture of the rack, the identifier information, and the location information are associated with one another.

Another embodiment is directed to a program product for execution on a portable device comprising a programmable processor, a screen coupled to the programmable processor, and a camera coupled to the programmable processor. The program product is tangibly stored on a non-transitory storage medium and comprises instructions operable to cause the programmable processor to obtain identifier information associated with one or more of a rack and equipment installed in the rack. The rack comprises a plurality of equipment positions into which one or more items of equipment can be inserted. The program product further comprises instructions operable to cause the programmable processor to display on the screen a picture of the rack captured using the camera, display on the screen an overlay that includes markings that define on the screen a perimeter of the rack and the plurality of equipment positions within the rack, and receive an alignment of the overlay on the picture of the rack. The program product further comprises instructions operable to cause the programmable processor to receive location information for the rack and communicate the picture of the rack, the alignment of the overlay on the picture of the rack, the identifier information, and the location information to a management application for storage thereby. The picture of the rack, the alignment of the overlay on the picture of the rack, the identifier information, and the location information are associated with one another.

Another embodiment is directed to a computer comprising a programmable processor configured to execute a management application and a network interface coupled to the programmable processor. The management application is configured to cause the computer to receive a picture of a rack, an alignment of an overlay on the picture of the rack, a rack identifier associated with the rack, and location information for the rack. The rack comprises a plurality of equipment positions, each of which is configured to receive a respective item of equipment. The overlay includes markings that define on the screen a perimeter of the rack and the plurality of equipment positions within the rack. The management is further configured to cause the computer to, in connection with populating a model for the rack, display the picture of the rack with the associated overlay visually aligned on the picture of the rack in accordance with the associated alignment, the associated overlay visually identifying the equipment positions for the rack and the picture showing the one or more items of equipment installed in the one or more corresponding equipment positions in the rack.

DRAWINGS

Like reference numbers and designations in the various drawings indicate like elements. The drawings are not necessarily drawn to scale.

DETAILED DESCRIPTION

Figure 1:
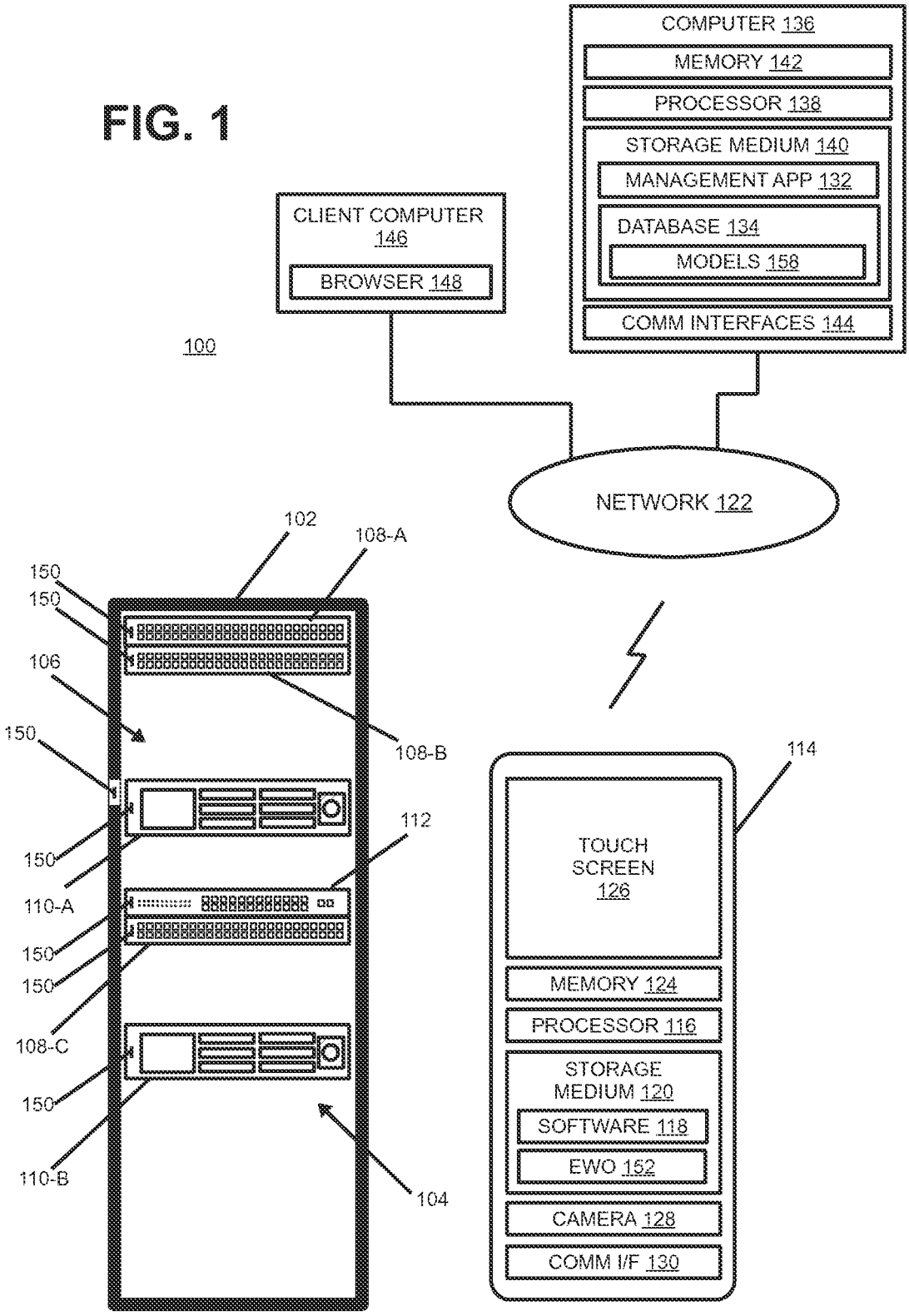
FIG. 1 is a block diagram of one exemplary embodiment of a system that can be used with the installation and configuration technology described here.

FIG. 1 is a block diagram of one example embodiment of a system 100 that can be used with the installation and configuration technology described below. However, it is to be understood that the installation and configuration technology described below can be implemented using other types of networks and systems.

In the example shown in FIG. 1, the system 100 includes a rack or other cabinet or enclosure 102 (which is referred to here simply as a "rack" 102). The rack 102 includes a plurality of positions 104 in which equipment 106 can be installed. These equipment positions are also referred to here as "slots" 104. For example, in one implementation, the rack 102 comprises a standard 19-inch rack comprising a frame or other enclosure that is designed to hold equipment whose height is standardized on a multiple of a "rack unit" or "U" that is 1.75 inches (or 44.55 millimeters) high. Examples of such racks 102 include, without limitation, 21 U racks (which have twenty one 1 U-high slots) and 42 U racks (which have forty two 1 U-high slots).

As noted above, each item of equipment 106 installed in the rack 102 has a height that is one or more rack units high. In the example shown in FIG. 1, the rack 102 includes twenty one 1 U-high slots 104 (though it is to be understood that the techniques described here can be used with other rack, cabinet, or enclosure configurations). Also, in this example, three patch panels 108 are installed in the rack 102. Each patch panel 108 is a 1 U patch panel 108 (that is, is one rack unit high). In this example, a first patch panel 108-A is installed in the first slot, a second patch panel 108-B is installed in the second slot, and a third patch panel 108-C is installed in the twelfth slot.

Furthermore, in this example, two server computers 110 (also referred here as "servers" 110) are installed in the rack 102. Both of the servers 110 are two rack units high (that is, are 2 U servers). A first server 110-A is installed in seventh and eighth slots, and a second server 110-B is installed in the sixteenth and seventeenth slots.

Also, in this example a switch 112 is installed in the rack 102. The server 112 is a 1 U server 112 (that is, is one rack unit high). In this example, the server 112 is installed in the eleventh slot.

It is to be understood that the configuration of the rack 102 and the equipment 106 installed in it are merely exemplary and that other configurations can be used.

A portable device 114 is used by a technician to capture information about the rack configuration. In this example, the portable device 114 is implemented using a smartphone (and is also referred to here as "smartphone" 114). However, the portable device 114 can be implemented in other ways (for example, using a portable computer).

In the embodiment shown in FIG. 1, the smartphone 114 comprises one or more programmable processors 116 for executing software 118. The software 118 comprises program instructions that are stored (or otherwise embodied) on or in an appropriate non-transitory storage medium or media 120 (such as flash or other non-volatile memory, magnetic disc drives, and/or optical disc drives) from which at least a portion of the program instructions are read by the programmable processor 116 for execution thereby. Although the storage media 120 is shown in FIG. 1 as being included in, and local to, the smartphone 114, it is to be understood that remote storage media (for example, storage media that is accessible over a network 122) and/or removable media can also be used. The smartphone 114 also includes memory 124 for storing the program instructions (and any related data) during execution by the programmable processor 116. Memory 124 comprises, in one implementation, any suitable form of random access memory (RAM) now known or later developed, such as dynamic random access memory (DRAM). In other embodiments, other types of memory are used.

The smartphone 114 also includes a touchscreen 126 for displaying information for a user of the smartphone 114 and for receiving touch input from a user.

The smartphone 114 also includes a camera 128 for capturing images and/or video.

The smartphone 114 also includes one or more communication interfaces 130 for communicating over a network 122. For example, the communication interfaces 130 can include one or more wireless interfaces (for example, supporting one or more cellular, wireless wide area network, or wireless local area network protocols and standards) and/or one or more wired interfaces (for example, supporting one or more serial bus interfaces (such as one or more of the Universal Serial Bus (USB) family of standards and protocols) or wired local area network interfaces (such as one or more of the ETHERNET family of wired local area network standards and protocols)).

In the exemplary embodiment shown in FIG. 1, one or more items of equipment 106 installed in the rack 102 includes some type of PLM technology to automatically obtain information about any cabling that is connected to the equipment 106 and to communicate that information back to a management application 132. Examples of such PLM technology include EEPROM-based PLM technology, RFID-based PLM technology, and RFID PLM technology. Other types of PLM technology can be used (for example, inference based PLM technology that infers connection information by sensing when connectors are inserted and removed from ports). This type of equipment 106 is also referred to here as "managed" equipment 106. Also, in the exemplary embodiment shown in FIG. 1, one or more items of equipment 106 installed in the rack 102 is "unmanaged" (that is, the equipment 106 does not include any type of PLM technology to automatically obtain information about any cabling that is connected to the equipment 106). More specifically, in this example, the patch panels 108 are managed equipment 106, and the servers 110 and switch 112 are unmanaged equipment 106.

Information about the rack 102 and the equipment 106 installed therein is tracked and maintained by a management application 132. In the example shown in FIG. 1, the management application 132 includes a database (or other data store) 134 in which the managed application 132 stores such information.

Also, in the example shown in FIG. 1, the management application 132 executes on one or more computers 136. In the embodiment shown in FIG. 1, each computer 136 on which the management application 132 executes comprises one or more programmable processors 138 for executing the management application 132. The management application 132 comprises program instructions that are stored (or otherwise embodied) on or in an appropriate non-transitory storage medium or media 140 (such as flash or other non-volatile memory, magnetic disc drives, and/or optical disc drives) from which at least a portion of the program instructions are read by the programmable processor 138 for execution thereby. Although the storage media 140 is shown in FIG. 1 as being included in, and local to, each computer 136, it is to be understood that remote storage media (for example, storage media that is accessible over the network 122) and/or removable media can also be used. Each computer 136 also includes memory 142 for storing the program instructions (and any related data) during execution by the programmable processor 138. Memory 142 comprises, in one implementation, any suitable form of RAM now known or later developed, such as DRAM. In other embodiments, other types of memory are used.

Each computer 136 on which the management application 132 executes also includes one or more communication interfaces 144 for communicating over the network 122. For example, the communication interfaces 144 can include one or more wireless interfaces (for example, supporting one or more cellular, wireless wide area network, or wireless local area network protocols and standards) and/or one or more wired interfaces (for example, supporting one or more serial bus interfaces (such as one or more of the USB family of standards and protocols) or wired local area network interfaces (such as one or more of the ETHERNET family of wired local area network standards and protocols)).

In the exemplary embodiment shown in FIG. 1, the management application 132 is implemented as browser-based application that can be accessed over the network 122 by one or more client computers 146 using a standard web browser 148. Also, in this example, the management application 132 can be accessed and interacted with using the software 118 executing on the smartphone 114. It is to be understood, however, that the management application 132 can be implemented in other ways.

Also, in the exemplary embodiment shown in FIG. 1, the rack 102 and the equipment 106 installed therein includes scannable codes 150 (such as barcodes or QR codes), where each scannable code 150 encodes an identifier assigned to the rack or item of equipment 106 to which the code 150 is attached. In this embodiment, the software 118 executing on the smartphone 114 is able to use the camera 128 to scan the codes 150 and then decode the identifiers encoded therein.

In the exemplary embodiment shown in FIG. 1, electronic work orders 152 can be generated (for example, by, or using information from, the management application 132) and communicated to the smartphone 114.

Each electronic work order (EWO) 152 specifies one or more steps that are to be carried out by a technician at a particular location. The electronic work order 152 can also request that the technician input or capture information using the smartphone 114, where the information is later provided to the management application 132 (for example, by communicating it to the management application 132 in real time over the network 122 or downloading it to the management application 132 at a later time).

Figure 2:
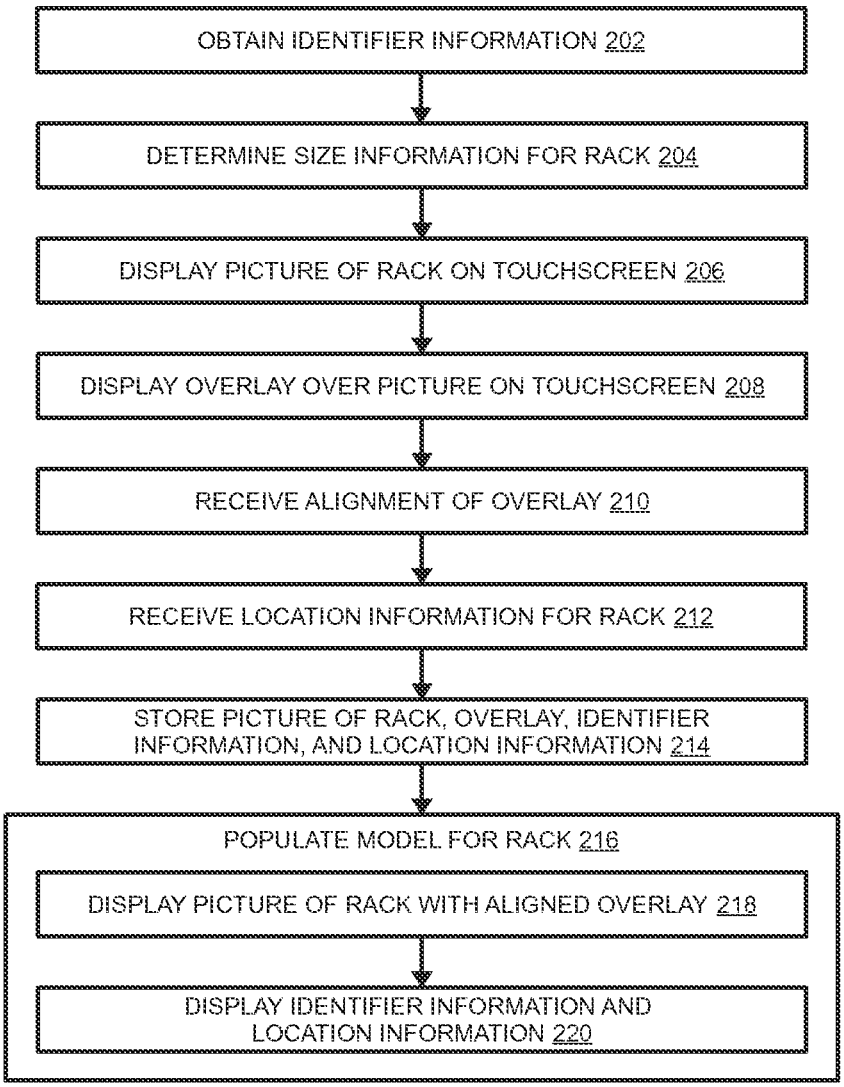
FIG. 2 is a flow diagram of one exemplary embodiment of a method of capturing information about a rack or other cabinet or enclosure.

FIG. 2 is a flow diagram of one exemplary embodiment of a method 200 of capturing information about a rack or other cabinet or enclosure. The embodiment of method 200 shown in FIG. 2 is described here as being implemented for use in the example shown in FIG. 1, though it is to be understood that method 200 can be implemented in other ways.

Method 200 comprises obtaining information about one or more identifiers associated with one or more of the rack 102 and the equipment 106 installed in the rack 102 (block 202). In the exemplary embodiment described here in connection with FIGS. 1 and 2, a technician can use the smartphone 114 to scan (using the camera 128 in the smartphone 114) the codes 150 on the rack 102 and the equipment 106 installed in the rack 102. The software 118 executing on the smartphone 114 can then decode the identifiers encoded in the codes 150.

The order in which the codes 150 should be scanned by the technician can be specified for the technician (for example, in an electronic work order 152). For example, the electronic work order 152 can instruct the technician to first scan the code 150 (or otherwise obtain the identifier information) for the rack 102 and then scan the codes 150 (or otherwise obtain the identifier information) for the items of equipment 106 installed in rack 102 from top down.

The identifier information for the rack 102 can also include information about names to be assigned to the rack 102 and the equipment 106 installed in the rack 102. These names can be obtained using the smartphone 114 (for example, by having the software 118 executing the software 114 prompt the technician to enter the names using the touchscreen 126) or using the management application 132.

The identifier information for the rack 102 can include information about what type of rack the rock 102 is (for example, by encoding a rack type or product type in the code 150 attached to the rack 102).

Method 200 further comprises determining size information for the rack 102 (block 204). The size information for the rack 102 identifies, for example, the height and width of the rack 102 and the number of slots or equipment positions in the rack 102.

In this embodiment, the software 118 executing on the smartphone 114 can be configured to determine if the smartphone 114 is communicatively coupled to the management application 132 (via the network 122) and, if it is, to communicate the identifier information for the rack 102 to the management application 132. Then, the management application 132 can use the identifier information for the rack 102 to check the database 134 for size information associated with that type of rack 102. If the database 134 contains size information for that type of rack 102, the size information for the rack 102 can be communicated back to the smartphone 114 over the network 122 for use by the smartphone 114 as described below. If the smartphone 114 is not communicatively coupled to the management application 132 or if the database 134 does not contain size information for the particular type of rack 102 used in the system 100, the software 118 executing on the smartphone 114 can, using the touchscreen 126, prompt the technician to enter the size of the rack 102 (for example, the number of slots 104 the rack 102 has and the width of the rack 102). This size information can be obtained in other ways.

Figure 3:
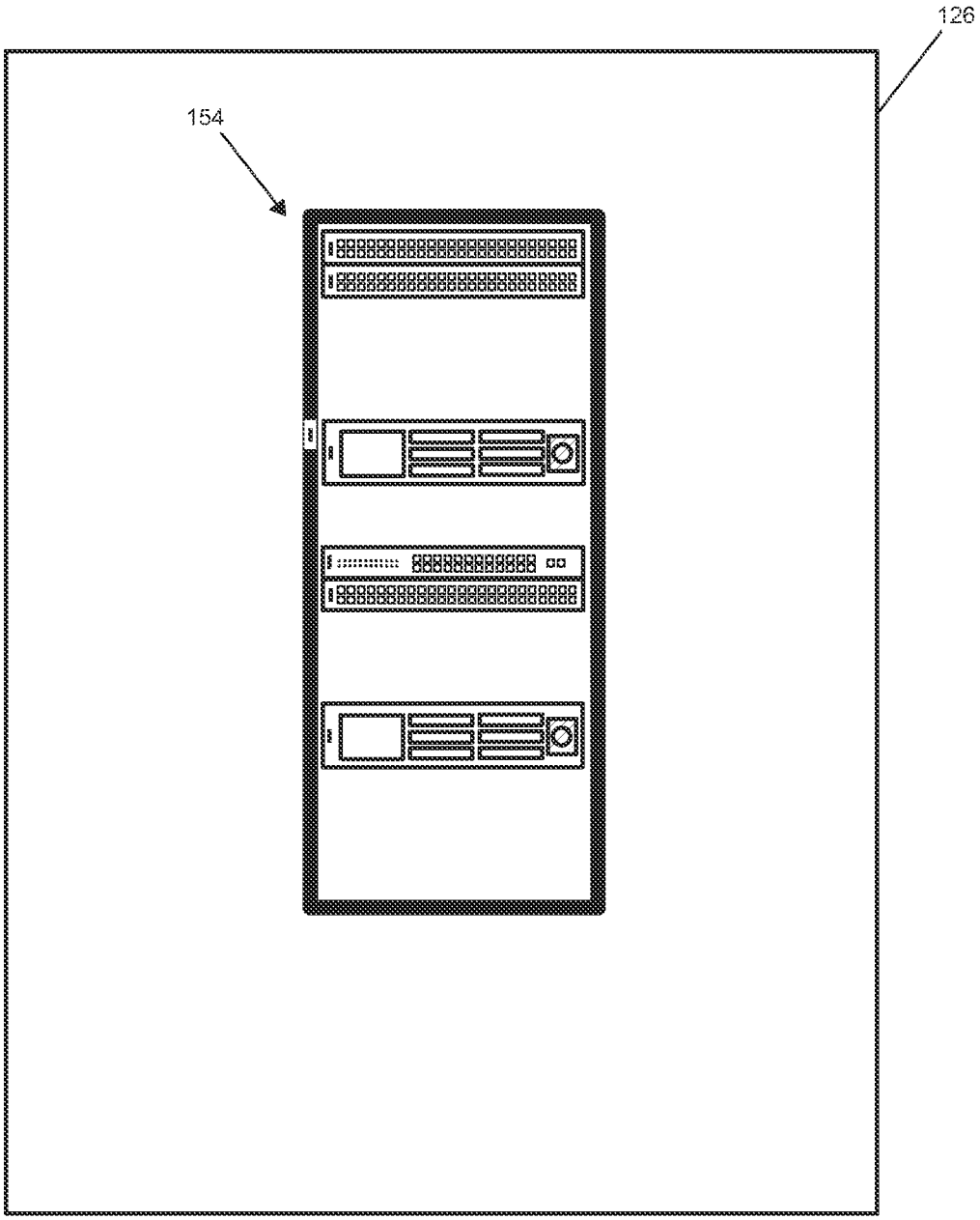
FIG. 3 shows one example of a picture taken of the rack shown in FIG. 1.

Method 200 further comprises displaying on the touchscreen 126 of the smartphone 114 a picture 154 of the rack 102 captured using the camera 128 included in the smartphone 114 (block 206). For example, the software 118 executing on the smartphone 114 can instruct the technician to appropriately position the camera 128 of the smartphone 114 and take a picture of the rack 102. Then, the software 118 can display the picture 154 of the rack 102 on the touchscreen 126. FIG. 3 shows one example of a picture 154 taken of the rack 102 shown in FIG. 1.

Figure 4A:
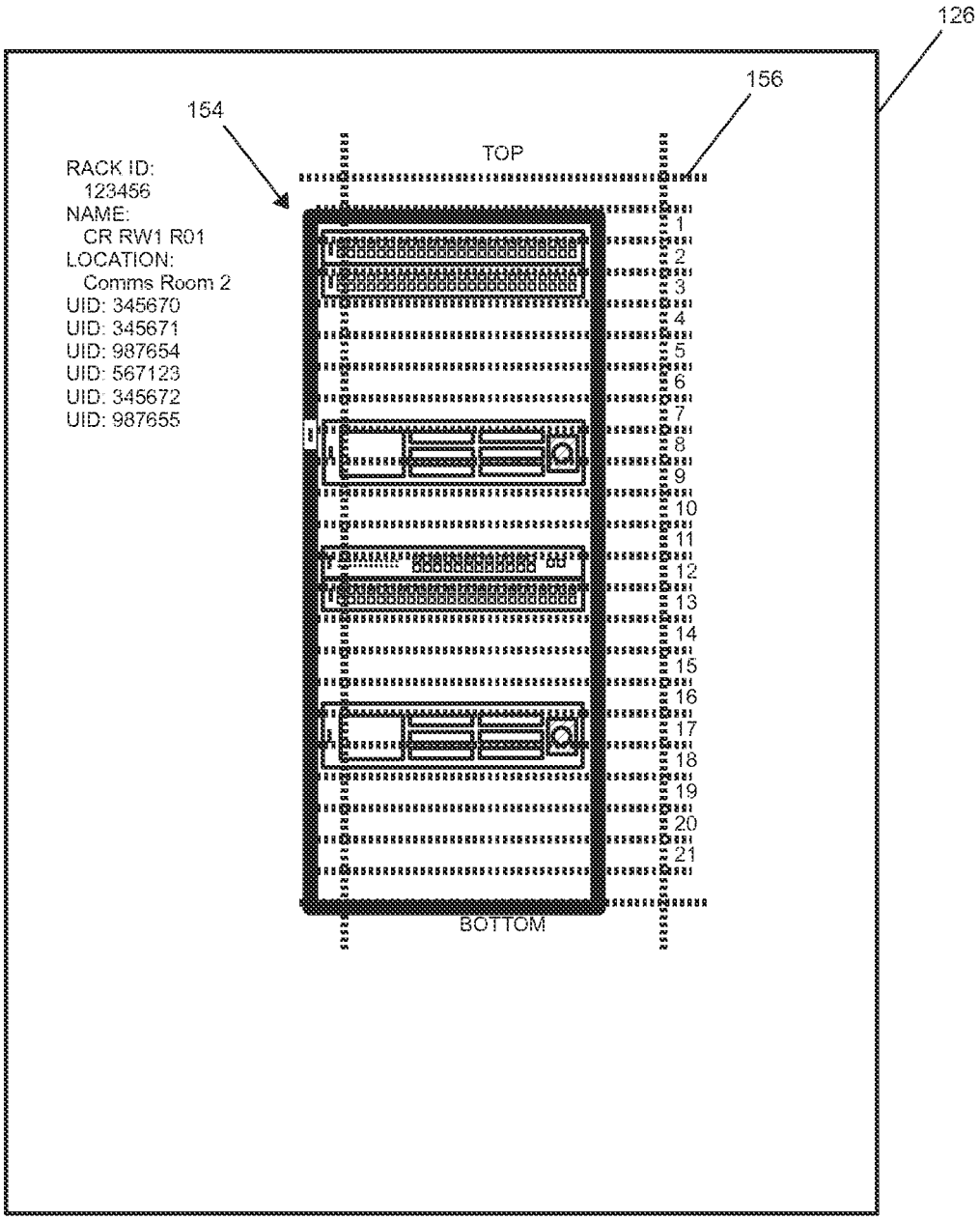
FIG. 4A shows a picture of the rack shown in FIG. 1 and an overlay before the overlay has been aligned.
Figure 4B:
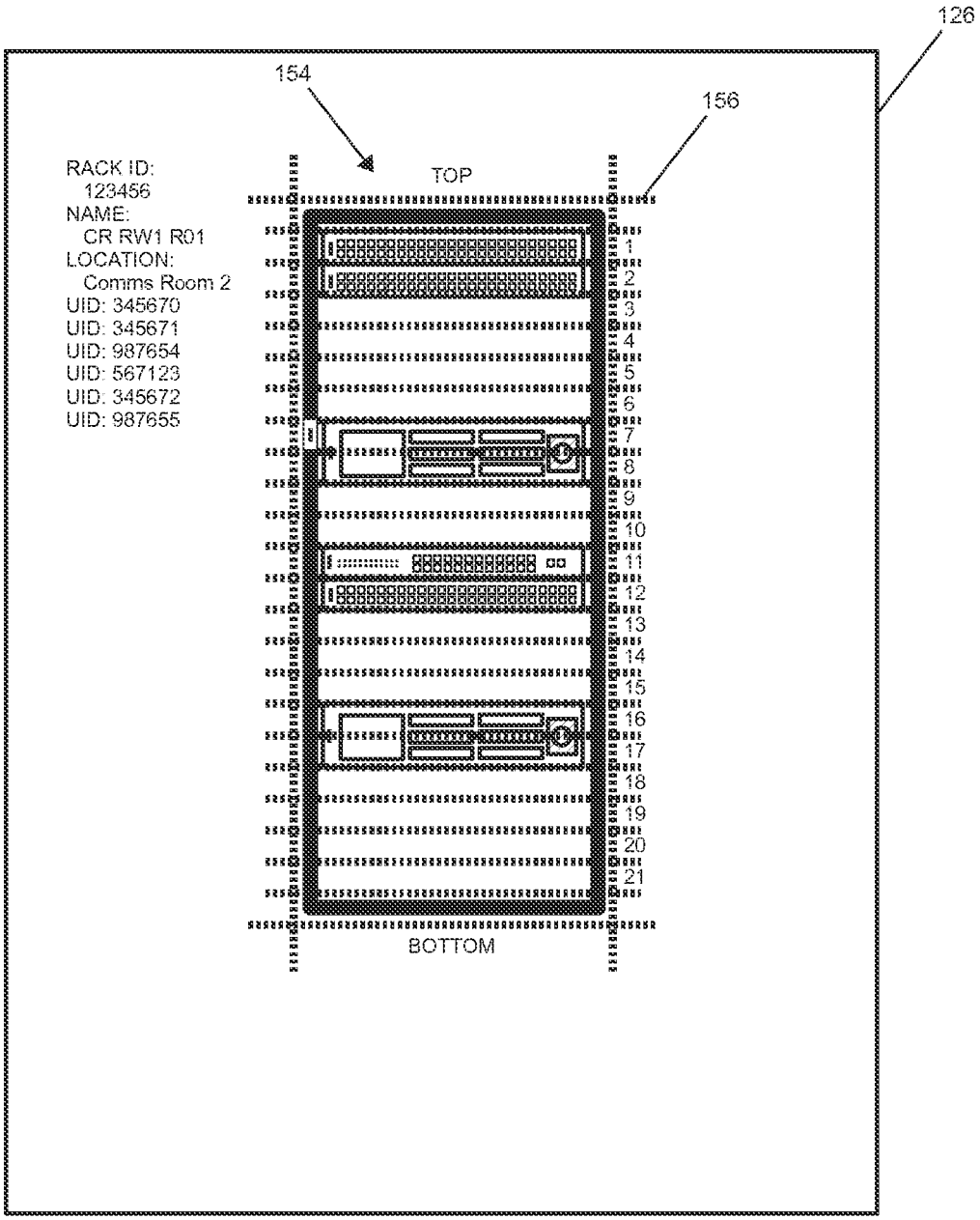
FIG. 4B shows the picture and overlay of FIG. 4A after the overlay has been aligned.

Method 200 further comprises displaying an overlay 156 over the picture 154 of the rack 102 displayed on the touchscreen 126 of the smartphone 114 (block 208). The overlay 156 includes markings that define the top, bottom, and side edges of the rack 102 as well as internal markings that define the slots 104 of the rack 102. One example of such a picture 154 and overlay 156 is shown in FIGS. 4A and 4B. FIG. 4A shows the picture 154 and overlay 156 before the overlay 156 has been aligned as described below in connection with block 210, and FIG. 4B shows the picture 154 and overlay 156 after the overlay 156 has been aligned as described below in connection with block 210.

Method 200 further comprises receiving, by the smartphone 114, an alignment of the overlay 156 on the picture 154 of the rack 102 (block 210). The overlay 156 is implemented using conventional user interface mechanisms that enable the technician to zoom the overlay 156 in and out, to move the overlay 156 around the picture 154 of the rack 102, and to adjust and move the top, bottom, and sides of the overlay 156 as well as the internal markings that define the slots 104. Once the technician has appropriately adjusted and aligned the overly 156 so that the markings are properly positioned on the top, bottom, and sides of the rack 102 as well as the slots 104 (as shown in FIG. 4B), the technician can provide an input to the software 118 indicating that fact. In response to this, the software 118 can then capture and store information about the overlay 156 and the alignment and positioning thereof.

Method 200 further comprises receiving location information for the rack 102 (block 212). The software 118 executing on the smartphone 114 can be used to prompt the technician to enter information about the location of the rack 102. This location information can include a building address and/or a floor, room, or row name or number for the rack 102. The location information can include other information (for example GPS coordinates, etc.).

Method 200 further comprises storing the picture 154 of the rack 102, the overlay 156 (including information about the alignment of the overlay 156 on the picture 154 of the rack 102), the identifier information, and the location information in the database 134 maintained by the management application 132 (block 214). These items are associated with the rack 102 in the database 134. Where any of these items have been obtained by the smartphone 114, those items are communicated or downloaded to the management application 132 (for example, over the network 122).

Method 200 further comprises, in connection with populating a model 158 for the rack 102 maintained by the management application (block 216), displaying the picture 154 of the rack 102 with the associated overlay 156 visually arranged and aligned on the picture 154 of the rack 102 as specified by the technician (block 218) and displaying the identifier information and the location information captured by the technician using the smartphone 114 (block 220).

In this embodiment, the management application 132 maintains a model 158 (or other object or data structure) used by the management application 132 to represent the rack 102. Typically, a technician would have to write down by hand notes about the rack 102 and the equipment 106 installed in the rack 102 and then later refer to the handwritten notes when populating the software model for the rack 102 and the equipment 106 installed in the rack 102. This can be inconvenient, error prone, and/or may not capture additional information that may be useful. Method 200, on the other hand, provides an approach to capturing information about the rack 102 and the equipment 106 installed in the rack 102 in a more convenient and accurate manner and may capture additional information (for example, a picture of the rack 102 and the equipment 106 installed in the rack 102) that may be useful.

For example, after a technician has completed the on-site capture of information about the rack 102 and the equipment 106 installed in the rack 102 as described above in connection blocks 202-214, the captured information can be used to populate a model 158 for the rack 102 by displaying this information alongside a visual representation of the model 158. This can be done using the smartphone 114 (for example, while the technician is located on-site with the rack 102). For example, the software 118 executing on the smartphone 114 can be configured to do this. Alternatively, a browser executing on the smartphone 114 can be used to interact with the management application 132 using the browser-based interface provided by the management application 132.

Also, the technician (or another person) can populate the model 158 using a client computer 146 that interacts with the management application 132 over the network 122. For example, as shown in FIG. 1, the client computer 146 can use a browser 148 to interact with the management application 132 using the browser-based interface provided by the management application 132.

Figure 5:
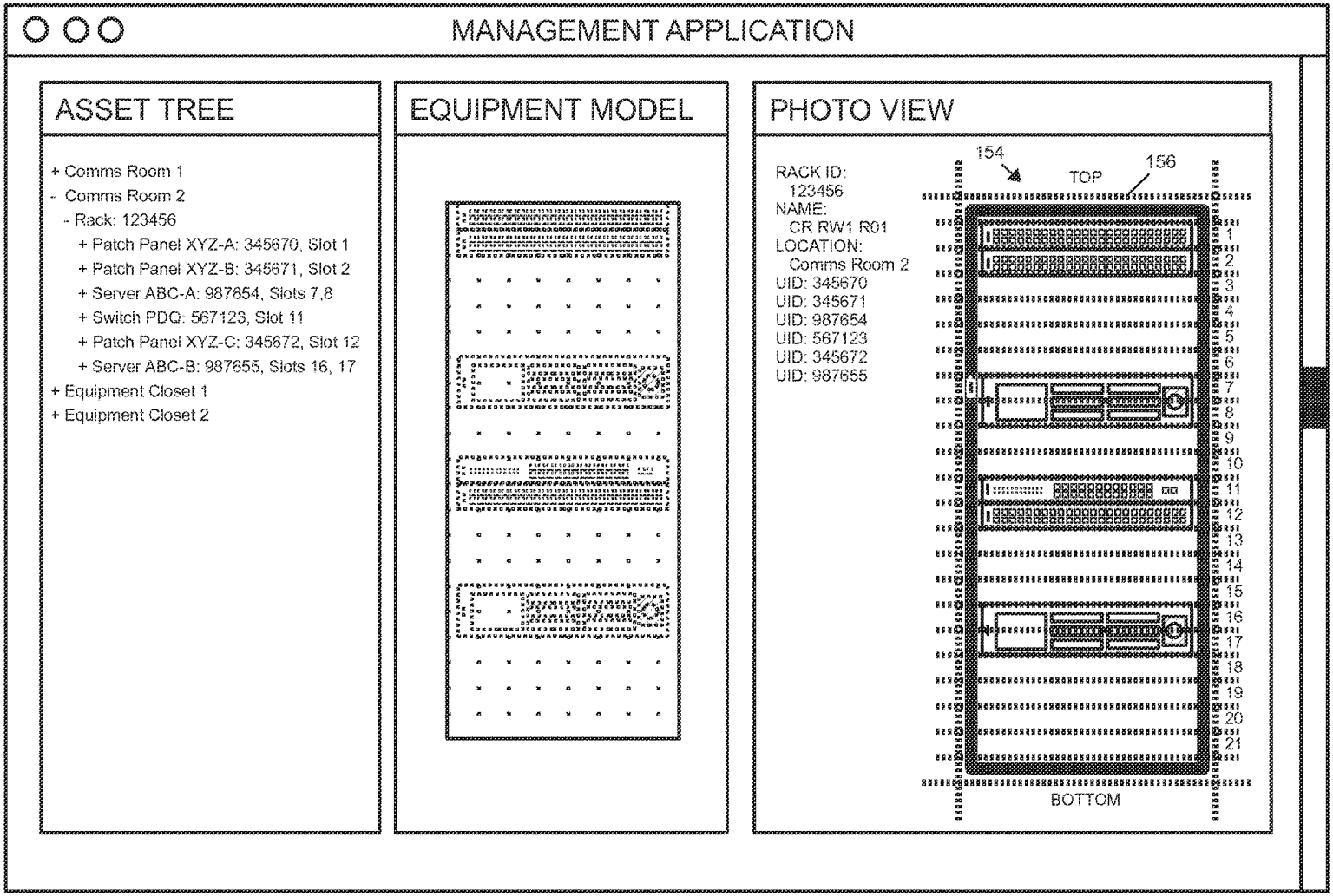
FIG. 5 shows one example of displaying the picture and overlay shown in FIG. 4B in connection with populating a model for the rack of FIG. 1.

One example of such a display is shown in FIG. 5. In this example, the model 158 for the rack 102 and the equipment 106 installed in the rack 102 is displayed using two views—a text view (the "ASSET TREE" window shown in FIG. 5) and a visual or virtual view (the "EQUIPMENT MODEL" window shown in FIG. 5). The display can included appropriate user interface functionality to enable a user to edit the information in the text view and the visual view. For example, as shown in FIG. 5, the text view can be implemented using a conventional "treeview" user interface element, which enables a user to enter, view, interact with, and/or edit textual information for the model 158 using a tree or hierarchy. Also, as shown in FIG. 5, the virtual view can be implemented using a conventional object-based image editor that enables a user to build, view, interact with, and edit the visual representation of the model 158 by click on and dragging- and dropping visual elements. In some implementations, textual information about an item shown in the visual view can be displayed if the user clicks on or hovers over the item shown in the visual view.

In the example shown in FIG. 5, the picture 154 of the rack 102 with the associated overlay 156 visually arranged and aligned on the picture 154 of the rack 102 as specified by the technician is also displayed (in the "PHOTO VIEW" window shown in FIG. 5) along with the views of the model 158. Also, identifier information and location information captured using the smartphone 114 is displayed. In this way, a user can refer to the picture 154 and the other displayed information while building and editing the model 158 for the rack 102. The overlay 156 that is displayed over the picture 154 of the rack 102 includes markings that define the various slots 104 and slot numbers for each slot 104. This can aid the user in determining which slot 104 a particular item of equipment 106 is inserted into. In the absence of such an overlay 156, it might be difficult for a user to make such a determination from the picture 154 alone. As a result, it is easier and more convenient for the user to accurately populate the model 158, without requiring the user to take hand written notes about the rack 102 and the equipment 106 installed in the rack 102. Also, the picture 154 and overlay 156 can be used for other purposes after the model 158 has been populated. Furthermore, portions of the picture 154 and/or overlay 156 can be integrated into the model 158 (for example, by cutting and pasting such portions into the model 158).

The techniques described here can be used to capture other information. For example, information about the power source used with the rack 102 and/or the equipment 106 installed in the rack 102 can be captured using the software 118 executing the smartphone 114 along with the other information described above (for example, by having the technician enter such information). Examples of such information include a power strip identifier that identifies a power strip that an item of equipment 106 is connected to and a number identifying the particular outlet in the power strip that the item is connected to. This information can then be provided to the management application 132 and used as described above.

A number of embodiments have been described. Nevertheless, it will be understood that various modifications to the described embodiments may be made without departing from the spirit and scope of the claimed invention. Also, combinations of the individual features of the above-described embodiments are considered within the scope of the inventions disclosed here.

EXAMPLE EMBODIMENTS

Example 1 includes a method comprising: obtaining, using a portable device, identifier information about one or more identifiers associated with one or more of a rack and equipment installed in the rack, wherein the rack comprises a plurality of equipment positions into which one or more items of equipment can be inserted and wherein the portable device comprises a camera and a screen; displaying on the screen of the portable device a picture of the rack captured using the camera; displaying on the screen of the portable device an overlay that includes markings that define on the screen a perimeter of the rack and the plurality of equipment positions within the rack; and receiving, by the portable device, an alignment of the overlay on the picture of the rack and the equipment positions; receiving location information for the rack; and storing the picture of the rack, the alignment of the overlay on the picture of the rack, the identifier location, and the location information by a management application, wherein the picture of the rack, the alignment of the overlay on the picture of the rack, the identifier information, and the location information are associated with one another.

Example 2 includes the method of Example 1, further comprising determining size information for the rack.

Example 3 includes the method of Example 2, wherein determining size information for the rack comprises: if the portable device is communicatively coupled to the management application: communicating the identifier information to the management application; and determining, by the management application, the size information for the rack based on the identifier information; if the portable device is not communicatively coupled to the management application or if the management application is not able to successfully determine the size information for the rack based on the identifier information, prompt a user, via the screen on the portable device, to define the size information for the rack manually using the portable device.

Example 4 includes the method of any of the Examples 1-3, wherein the rack includes one or more items of equipment installed in one or more corresponding equipment positions in the rack; and wherein the method further comprises, in connection with populating a model for the rack, displaying the picture of the rack with the associated overlay visually aligned on the picture of the rack in accordance with the associated alignment, the associated overlay visually identifying the equipment positions for the rack and the picture showing the one or more items of equipment installed in the one or more corresponding equipment positions in the rack.

Example 5 includes the method of Example 4, wherein populating the model for the rack is performed using at least one of the portable device and a client computer coupled to the management application over a network.

Example 6 includes the method of any of the Examples 4-5, wherein the one or more items of equipment installed in the rack comprises one or more of: a patch panel, a switch, and a server.

Example 7 includes the method of any of the Examples 1-6, wherein at least some the equipment installed in the rack comprises managed equipment that is configured to automatically obtain information about cabling that is attached to the managed equipment.

Example 8 includes the method of any of the Examples 1-7, wherein the managed equipment is configured to use at least one of the following to automatically obtain information about cabling that is attached to the managed equipment: EEPROM-based physical layer management technology, RFID-based physical layer management technology, inference-based physical layer management technology, and ninth-wire physical layer management technology.

Example 9 includes the method of any of the Examples 1-8, wherein at least some of the equipment installed in the rack comprises unmanaged equipment that is not configured to automatically obtain information about cabling that is attached to the unmanaged equipment.

Example 10 includes the method of any of the Examples 1-9, wherein obtaining the identifier information comprises at least one of: scanning one or more codes associated with the identifier information using the camera of the portable device; manually entering the identifier information using the portable device; and assigning the identifier information using the portable device.

Example 11 includes the method of any of the Examples 1-10, wherein the portable device comprises at least one of a smartphone and a portable computer.

Example 12 includes a portable device comprising: a programmable processor configured to execute software; a screen coupled to the programmable processor; and a camera; wherein the portable device is configured to do the following: obtain identifier information about one or more identifiers associated with one or more of a rack and equipment installed in the rack, wherein the rack comprises a plurality of equipment positions into which one or more items of equipment can be inserted; display on the screen a picture of the rack captured using the camera; display on the screen an overlay that includes markings that define on the screen a perimeter of the rack and the plurality of equipment positions within the rack; and receive an alignment of the overlay on the picture of the rack and the equipment positions; receive location information for the rack; and communicate the picture of the rack, the alignment of the overlay on the picture of the rack, the identifier information, and the location information to a management application for storage thereby, wherein the picture of the rack, the alignment of the overlay on the picture of the rack, the identifier information, and the location information are associated with one another.

Example 13 includes the portable device of Example 12, wherein the portable device comprises at least one of a smartphone and a portable computer.

Example 14 includes the portable device of any of the Examples 12-13, wherein the portable device is further configured to communicate the identifier information to the management application so that the management application can determine the size information for the rack based on the identifier information.

Example 15 includes the portable device of any of the Examples 12-14, wherein the portable device is further configured to prompt a user, via the screen, to enter size information for the rack using the portable device.

Example 16 includes the portable device of any of the Examples 12-15, wherein the rack includes one or more items of equipment installed in one or more corresponding equipment positions in the rack; and wherein the portable device is further configured to, in connection with populating a model for the rack, display the picture of the rack with the associated overlay visually aligned on the picture of the rack in accordance with the associated alignment, the associated overlay visually identifying the equipment positions for the rack and the picture showing the one or more items of equipment installed in the one or more corresponding equipment positions in the rack.

Example 17 includes the portable device of Example 16, wherein the one or more items of equipment installed in the rack comprises one or more of: a patch panel, a switch, and a server.

Example 18 includes the portable device of any of the Examples 12-17, wherein the portable device is configured to obtain the identifier information by doing at least one of: scanning a code associated with the rack using the camera; receiving manually entered identifier information; and assigning the identifier information.

Example 19 includes a program product for execution on a portable device comprising a programmable processor, a screen coupled to the programmable processor, and a camera coupled to the programmable processor, wherein the program product is tangibly stored on a non-transitory storage medium and comprises instructions operable to cause the programmable processor to: obtain identifier information associated with one or more of a rack and equipment installed in the rack, wherein the rack comprises a plurality of equipment positions into which one or more items of equipment can be inserted; display on the screen a picture of the rack captured using the camera; display on the screen an overlay that includes markings that define on the screen a perimeter of the rack and the plurality of equipment positions within the rack; and receive an alignment of the overlay on the picture of the rack; receive location information for the rack; and communicate the picture of the rack, the alignment of the overlay on the picture of the rack, the identifier information, and the location information to a management application for storage thereby, wherein the picture of the rack, the alignment of the overlay on the picture of the rack, the identifier information, and the location information are associated with one another.

Example 20 includes a computer comprising: a programmable processor configured to execute a management application; and a network interface coupled to the programmable processor; wherein the management application is configured to cause the computer to do the following: receive a picture of a rack, an alignment of an overlay on the picture of the rack, a rack identifier associated with the rack, and location information for the rack, wherein the rack comprises a plurality of equipment positions, each of which is configured to receive a respective item of equipment, and wherein the overlay includes markings that define on the screen a perimeter of the rack and the plurality of equipment positions within the rack; and in connection with populating a model for the rack, display the picture of the rack with the associated overlay visually aligned on the picture of the rack in accordance with the associated alignment, the associated overlay visually identifying the equipment positions for the rack and the picture showing the one or more items of equipment installed in the one or more corresponding equipment positions in the rack.

What is claimed is:

1. A method comprising:

obtaining, using a portable device, identifier information about one or more identifiers associated with one or more of a rack and equipment installed in the rack, wherein the rack comprises a plurality of equipment positions into which one or more items of equipment can be inserted and wherein the portable device comprises a camera and a screen;

displaying on the screen of the portable device a picture of the rack captured using the camera;

displaying on the screen of the portable device an overlay that includes markings that define on the screen *at least one of* a perimeter of the rack and the plurality of equipment positions within the rack;

receiving, by the portable device [based on input from a user], an alignment of the overlay relative to the rack and the equipment positions shown in the picture

[resulting from the user interacting with the overlay displayed on the screen of the portable device to interactively adjust and align the overlay relative to the rack and the equipment positions shown in the picture];

receiving location information for the rack;

storing the picture of the rack, the alignment of the overlay relative to the rack and equipment positions shown in the picture, the identifier [location] *information*, and the location information by a management application, wherein the picture of the rack, the alignment of the overlay relative to the rack and the equipment positions shown in the picture, the identifier information, and the location information are associated with one another; and in connection with a user entering data into a model for the rack that is stored in a database, displaying a user interface including user interface elements configured to display a view of the model for the user to enter data into the model, wherein the user interface is further configured to, while displaying the view of the model for the user to enter data into the model, also display the picture of the rack with the associated overlay visually aligned on the picture of the rack in accordance with the associated alignment along with at least some of the identifier information about the one or more identifiers associated with one or more of the rack and any equipment installed in the rack, the associated overlay visually identifying the equipment positions for the rack and the picture showing any equipment installed in the one or more corresponding equipment positions in the rack.

2. The method of claim 1, further comprising determining size information for the rack.

3. The method of claim 2, wherein determining size information for the rack comprises:

when the portable device is communicatively coupled to the management application:

communicating the identifier information to the management application; and determining, by the management application, the size information for the rack based on the identifier information; and when the portable device is not communicatively coupled to the management application or when the management application is not able to successfully determine the size information for the rack based on the identifier information, prompt the user, via the screen on the portable device, to define the size information for the rack manually using the portable device.

4. The method of claim 1, wherein the user interface is displayed on at least one of the portable device and a client computer coupled to the management application over a network.

5. The method of claim 1, wherein the equipment installed in the rack comprises one or more of: a patch panel, a switch, and a server.

6. The method of claim 1, wherein at least some the equipment installed in the rack comprises managed equipment that is configured to automatically obtain information about cabling that is attached to the managed equipment.

7. The method of claim 1, wherein the managed equipment is configured to use at least one of the following to automatically obtain information about cabling that is attached to the managed equipment: EEPROM-based physical layer management technology, RFID-based physical layer management technology, inference-based physical layer management technology, and ninth-wire physical layer management technology.

8. The method of claim 1, wherein at least some of the equipment installed in the rack comprises unmanaged equipment that is not configured to automatically obtain information about cabling that is attached to the unmanaged equipment.

9. The method of claim 1, wherein obtaining the identifier information comprises at least one of:

scanning one or more codes associated with the identifier information using the camera of the portable device;

manually entering the identifier information using the portable device; and assigning the identifier information using the portable device.

10. The method of claim 1, wherein the portable device comprises at least one of a smartphone and a portable computer.

11. A portable device comprising:

a programmable processor configured to execute software;

a screen coupled to the programmable processor; and a camera;

wherein the portable device is configured to do the following:

obtain identifier information about one or more identifiers associated with one or more of a rack and equipment installed in the rack, wherein the rack comprises a plurality of equipment positions into which one or more items of equipment can be inserted;

display on the screen a picture of the rack captured using the camera;

display on the screen an overlay that includes markings that define on the screen *at least one of* a perimeter of the rack and the plurality of equipment positions within the rack; and receive[, based on input from a user,] an alignment of the overlay relative to the rack and the equipment positions shown in the picture [resulting from the user interacting with the overlay displayed on the screen of the portable device to interactively adjust and align the overlay relative to the rack and the equipment positions shown in the picture];

receive location information for the rack;

communicate the picture of the rack, the alignment of the overlay relative to the rack and the equipment positions shown in the picture, the identifier information, and the location information to a management application for storage thereby, wherein the picture of the rack, the alignment of the overlay relative to the rack and the equipment positions shown in the picture, the identifier information, and the location information are associated with one another; and in connection with a user entering data into a model for the rack that is stored in a database, display a user interface including user interface elements configured to display a view of the model for the user to enter data into the model, wherein the user interface is further configured to, while displaying the view of the model for the user to enter data into the model, also display the picture of the rack with the associated overlay visually aligned on the picture of the rack in accordance with the associated alignment along with at least some of the identifier information about the one or more identifiers associated with one or more of the rack and any equipment installed in the rack, the associated overlay visually identifying the equipment positions for the rack and the picture showing any equipment installed in the one or more corresponding equipment positions in the rack.

12. The portable device of claim 11, wherein the portable device comprises at least one of a smartphone and a portable computer.

13. The portable device of claim 11, wherein the portable device is further configured to communicate the identifier information to the management application so that the management application can determine the size information for the rack based on the identifier information.

14. The portable device of claim 11, wherein the portable device is further configured to prompt the user, via the screen, to enter size information for the rack using the portable device.

15. The portable device of claim 11, wherein the equipment installed in the rack comprises one or more of: a patch panel, a switch, and a server.

16. The portable device of claim 11, wherein the portable device is configured to obtain the identifier information by doing at least one of:

scanning a code associated with the rack using the camera;

receiving manually entered identifier information; and assigning the identifier information.

17. A program product for execution on a portable device comprising a programmable processor, a screen coupled to the programmable processor, and a camera coupled to the programmable processor, wherein the program product is tangibly stored on a non-transitory storage medium and comprises instructions operable to cause the programmable processor to:

obtain identifier information associated with one or more of a rack and equipment installed in the rack, wherein the rack comprises a plurality of equipment positions into which one or more items of equipment can be inserted;

display on the screen a picture of the rack captured using the camera;

display on the screen an overlay that includes markings that define on the screen *at least one of* a perimeter of the rack and the plurality of equipment positions within the rack; and receive[, based on input from a user,] an alignment of the overlay relative to the rack and the equipment positions shown in the picture [resulting from the user interacting with the overlay displayed on the screen of the portable device to interactively adjust and align the overlay relative to the rack and the equipment positions shown in the picture];

receive location information for the rack;

communicate the picture of the rack, the alignment of the overlay relative to the rack and equipment positions shown in the picture, the identifier information, and the location information to a management application for storage thereby, wherein the picture of the rack, the alignment of the overlay relative to the rack and equipment positions shown in the picture, the identifier information, and the location information are associated with one another; and in connection with a user entering data into a model for the rack that is stored in a database, display a user interface including user interface elements configured to display a view of the model for the user to enter data into the model, wherein the user interface is further configured to, while displaying the view of the model for the user to enter data into the model, also display the picture of the rack with the associated overlay visually aligned on the picture of the rack in accordance with the associated alignment along with at least some of the identifier information about [the] one or more identifiers associated with one or more of the rack and any equipment installed in the rack, the associated overlay visually identifying the equipment positions for the rack and the picture showing any equipment installed in the one or more corresponding equipment positions in the rack.

18. A computer comprising:

a programmable processor configured to execute a management application; and a network interface coupled to the programmable processor;

wherein the management application is configured to cause the computer to do the following:

receive a picture of a rack, an alignment of an overlay on the picture of the rack, a rack identifier associated with the rack, and location information for the rack, wherein the rack comprises a plurality of equipment positions, each of which is configured to receive a respective item of equipment, and wherein the overlay includes markings that define on the screen *at least one of* a perimeter of the rack and the plurality of equipment positions within the rack; and in connection with a user entering data into a model for the rack that is stored in a database, display a user interface including user interface elements configured to display a view of the model for the user to enter data into the model, wherein the user interface is further configured to, while displaying the view of the model for the user to enter data into the model, also display the picture of the rack with the associated overlay visually aligned on the picture of the rack in accordance with the associated alignment along with at least some [of the] identifier information about the [one or more identifiers] *rack identifier* associated with one or more of the rack and any equipment installed in the rack, the associated overlay visually identifying the equipment positions for the rack and the picture showing any equipment installed in the one or more corresponding equipment positions in the rack.

*19. The method of claim 1, further wherein:*

*both the perimeter of the rack and the plurality of equipment positions within the rack are displayed on the screen of the portable device with the overlay; and*

*the alignment resulting from a user interacting with the overlay displayed on the screen of the portable device to interactively adjust and align the overlay relative to the rack and the equipment positions shown in the picture.*

*20. The portable device of claim 11, further wherein:*

*both the perimeter of the rack and the plurality of equipment positions within the rack are displayed on the screen with the overlay; and*

*the alignment resulting from a user interacting with the overlay displayed on the screen of the portable device to interactively adjust and align the overlay relative to the rack and the equipment positions shown in the picture.*

*21. The program product of claim 17, further wherein:*

*both the perimeter of the rack and the plurality of equipment positions within the rack are displayed on the screen with the overlay; and*

*the alignment resulting from a user interacting with the overlay displayed on the screen of the portable device to interactively adjust and align the overlay relative to the rack and the equipment positions shown in the picture.*

*22. The computer of claim 18, further wherein:*

*both the perimeter of the rack and the plurality of equipment positions within the rack are displayed on the screen with the overlay.*

* * * * *